(12) United States Patent
Maabo (10) Patent No.: US 9,398,760 B2
(45) Date of Patent: Jul. 26, 2016

(54) FISH FARMING PLANT, MODULE, METHOD AND USE

(71) Applicant: Preline Fishfarming System AS, Stathelle (NO)

(72) Inventor: Rune Maabo, Stathelle (NO)

(73) Assignee: PRELINE FISHFARMING SYSTEM AS, Stathelle (NO)

( * ) Notice: Subject to any disclaimer, the term of this patent is extended or adjusted under 35 U.S.C. 154(b) by 238 days.

(21) Appl. No.: 14/347,101

(22) PCT Filed: Sep. 27, 2012

(86) PCT No.: PCT/NO2012/050185
§ 371 (c)(1),
(2) Date: Mar. 25, 2014

(87) PCT Pub. No.: WO2013/048259
PCT Pub. Date: Apr. 4, 2013

(65) Prior Publication Data
US 2014/0283754 A1    Sep. 25, 2014

(30) Foreign Application Priority Data

Sep. 28, 2011 (NO) .................................... 20111316

(51) Int. Cl.
*A01K 61/00*      (2006.01)
(52) U.S. Cl.
CPC .................................... *A01K 61/007* (2013.01)
(58) Field of Classification Search
CPC ...... A01K 61/00; A01K 61/007; A01G 33/00
USPC ............................................. 47/1.4; 119/223
See application file for complete search history.

(56) References Cited

U.S. PATENT DOCUMENTS 3,653,358 A * 4/1972 Fremont .............. A01K 61/007
                                                     119/223
4,044,720 A    8/1977 Fast
(Continued)

FOREIGN PATENT DOCUMENTS

CN           2850273 Y      12/2006
CN         101052297 A      10/2007
(Continued)

OTHER PUBLICATIONS

International Search Report issued Dec. 21, 2012 in corresponding International Application No. PCT/NO2012/050185.
(Continued)

*Primary Examiner* — Monica Williams
*Assistant Examiner* — Michael A Fabula
(74) *Attorney, Agent, or Firm* — Wenderoth, Lind & Ponack, L.L.P.

(57) ABSTRACT

A fish farming plant is adapted for floating in free water. The plant comprises a substantially vertical inlet pipe and a corresponding outlet pipe for taking in and discharging water, respectively, at a water depth having the desired water quality at a depth (h). A substantially horizontal residential compartment of an accommodation assembly has an inlet end and an outlet end. Lattices are provided at the inlet end and the outlet end. Also provided at the ends are angled end sections for connecting the inlet pipe, outlet pipe, and the residential compartment. The plant also comprises at least one arrangement for providing water flow through the residential compartment. A module for a residential compartment of a fish farming plant, a method for manufacturing an accommodation assembly, use of such a fish farming plant for smolt, as well as a method for emptying such a fish farming plant are also provided.

17 Claims, 6 Drawing Sheets

(56) References Cited

U.S. PATENT DOCUMENTS

| | | | | |
|---|---|---|---|---|
| 4,711,199 A * | 12/1987 | Nyman | A01K 61/007 119/223 |
| 4,798,168 A * | 1/1989 | Vadseth | A01K 61/007 119/223 |
| 4,915,059 A * | 4/1990 | Long | A01K 61/007 119/215 |
| 5,438,958 A * | 8/1995 | Ericsson | A01K 61/007 119/223 |
| 5,450,818 A * | 9/1995 | Caillouet | A01K 61/00 119/223 |
| 5,762,024 A * | 6/1998 | Meilahn | A01K 61/007 119/211 |
| 7,717,065 B2 * | 5/2010 | McRobert | A01K 61/007 119/226 |
| 8,651,058 B1 * | 2/2014 | Pierce | A01K 61/00 119/215 |
| 8,950,361 B1 * | 2/2015 | Pierce | A01K 61/003 119/200 |
| 2004/0123809 A1 * | 7/2004 | Klein | A01K 61/007 119/223 |
| 2005/0034676 A1 * | 2/2005 | Taylor | A01K 61/007 119/219 |
| 2006/0102087 A1 | 5/2006 | Page | | |

FOREIGN PATENT DOCUMENTS

| | | | | |
|---|---|---|---|---|
| DE | 10 2008 057 515 A1 | 5/2010 | | |
| FR | 2 565 463 | 12/1985 | | |
| GB | 2078473 A * | 1/1982 | | A01K 61/007 |
| NO | 882829 | 12/1989 | | |
| NO | 315633 B1 | 10/2003 | | |
| WO | 03/067971 | 8/2003 | | |

OTHER PUBLICATIONS

Norwegian Search Report issued Mar. 21, 2012 in corresponding Norwegian Application No. 20111316.

* cited by examiner

FISH FARMING PLANT, MODULE, METHOD AND USE

BACKGROUND OF THE INVENTION

1. Field of the Invention

The present invention relates to a farming plant for the breeding of marine fauna, adapted for floating in free water. Additionally, the invention relates to a module for a farming plant, a method for manufacturing a residential compartment of a modular farming plant, use of such a farming plant for the breeding of smolt, as well as a method for emptying such a plant. In the context of the present invention, a fish farming plant is intended to cover a farming plant for the breeding of marine fauna.

The present invention is designed especially for fish/aquaculture farming, e.g., for the breeding of smolt, among other things, which is a phase of the salmon life cycle subsequent to the fry phase and adaptation for life in sea water, but before the fish is considered an adult salmon. However, the invention may also advantageously be used for farming adult salmon, other fish species, shellfish, or other marine organisms belonging to the marine fauna.

2. Description of Related Art

In the breeding of marine fauna in free water, it is a problem that the habitat for the fauna is poorly controllable. A further problem is that the organisms, such as the fish, for example, may be able to escape. This is a problem both because valuable fish are lost, and also because the environment nearby the plant can be ruined by the introduction of species which do not belong in the local environment. This is particularly a problem in the production of smolt. Additional problems can be related to poor control of fodder, medication, water temperature, as well as the accumulation of contaminations/faecal, etc.

Consequently, land-based breeding of smolt in tanks and pools has been suggested. Such installations, however, are space-consuming and require easy access to sea water. Other installations that have been suggested include tanks in the form of elongate, circular, translucent, synthetic pipes constituting residential compartments designed for floating in the sea. In such installations, water is taken from a given water depth in order to provide water free of harmful organisms such as salmon lice and in order to provide water having a relatively constant, low temperature. The applicant has developed plants of the type indicated above.

However, a problem associated with such plants is that salmon lice and other undesirable parasites, pathogens, and predators may get into the residential compartment, especially if the circulation maintained in the compartment ceases. These organisms may then move upstream and into the residential compartment. In such a situation, one generally has little control of the environment inside the residential compartment.

Other problems associated with installations of a type indicated above are that the circular, translucent pipes constituting the residential compartment cannot easily be produced larger than a certain size, and it is hence difficult to manufacture residential compartments that are large enough to enable the production of sufficient marine fauna. In the case of salmon/smolt, such fish also prefer to be able to swim in a more horizontal plane over up and down in depth. Circular pipes limit the ability of the fish to move in the horizontal plane more than oval pipes do. Oval pipes also ensure that a larger portion of the fish is allowed the freedom to move across the largest width dimension of the pipe.

SUMMARY OF THE INVENTION

The present invention aims at solving these and other problems related to the operation, maintenance, emptying, and sizing of a farming plant. Hence, the present invention relates to a farming plant for the breeding of marine fauna.

The farming plant according to the invention is adapted for floating in free water and comprises an inlet pipe adapted for supplying water. A substantially horizontal accommodation assembly including a closed residential compartment comprises an inlet end and an outlet end. In this context, a horizontal position refers to the approximate position assumed by the accommodation assembly during operation of the accommodation assembly. Horizontal is understood to be relative to a longitudinal axis of the residential compartment, extending perpendicularly to a plane defined by an oval cross section of the residential compartment. A first end section is defined between the inlet pipe and the inlet end of the residential compartment. At least one arrangement is provided for providing water flow through the residential compartment. At least one barrier lattice is positioned at the inlet end of the residential compartment. The accommodation assembly further includes an inlet end and an outlet pipe for discharging water. A second end section is located between the outlet pipe and the outlet end of the residential compartment. At least one barrier lattice is positioned at the outlet end of the residential compartment. The residential compartment is a closed chamber having at least one feeding opening along a top side of the accommodation assembly. The residential compartment of the accommodation assembly has a flow direction and an oval cross section transverse to the flow direction.

Preferably, the at least one feeding opening is oblong in a transverse direction so as to cover substantially the entire width of the oval residential compartment. In this manner, it is easier to monitor the fish in the residential compartment while, at the same time, the fodder can be dispersed across substantially the entire width of the residential compartment. Thus, the combination of the oval cross-section and at least one oblong feeding opening results in an improved fodder distribution and improved visual monitoring of the fish as compared to a circular pipe of the same volume. The at least one oblong feeding opening is also well suited for a modular design according to the invention. In addition, the at least one feeding opening covers substantially the entire width of the oval residential compartment, and it is also easy to cover the entire opening with a net in order to prevent seabirds and possibly other predators from preying on the fish. The opening(s) can also be covered entirely during extreme weather conditions in order to prevent waves, for example, from washing over the edge of the opening(s). Such waves could otherwise carry salmon lice and other parasites into the residential compartment.

The farming plant may comprise a substantially vertical inlet pipe adapted for taking water from a water depth having a desired water quality at a depth (h). In this context, horizontal, vertical, tilted, etc. are relative to a position used during normal operation of the plant for describing the type of plant and for describing the orientation of the different components relative to each other. However, the plant may of course assume other angles during production, installation, and emptying without departing from the invention.

The residential compartment of the farming plant is substantially watertight and comprises, as mentioned above, an inlet end and an outlet end. The residential compartment may further comprise an angled, first end section between the inlet pipe and residential compartment and the at least one means for providing water flow through the residential compartment. The end sections are mounted at the ends of the accommodation assembly. Barrier lattices are provided at the inlet end, generally between the first end section and the residential compartment in order to prevent the marine fauna from being able to escape the residential compartment. In other words, the barrier lattices are positioned at each end of the accommodation assembly to define the residential compartment. Outlet pipes for discharging water at a water depth (h) are provided running substantially parallel with the inlet pipe. An angled, second, end section is provided between the outlet pipe and the outlet end of the residential compartment. At least one barrier lattice is positioned at the outlet end, generally between the outlet pipe and the second end section and the residential compartment. In other words, the barrier lattices are positioned at each end of the residential compartment of the accommodation assembly, defining the residential compartment. The accommodation assembly with the residential compartment forms a submerged longitudinal flow pool.

Typically, the plant will be anchored to a sea floor by way of suitable moorings and mooring chains.

A first means for providing water flow may be provided in the first end section, and a second means for providing water flow may be provided in the second end section.

The at least one means for providing water flow may include a motor which, during operation of the plant, is located above the water surface, a substantially vertical shaft connected to the motor and a propeller rotating in a substantially horizontal plane. In this manner, the motor(s) may be inspected, overhauled, or replaced without lifting the plant, and without the use of divers. Moreover, the motor(s) does/do not have to be of a submergible type. By using vertical shafts and horizontal flow creators/propellers, the use of gears or other links in the associated transmission line is avoided. This results in a more economical structure, lower mechanical losses, and better operational reliability. The water flow provisioning arrangements can easily be made adjustable to control the water flow and oxygen content.

Typically, the flow provisioning arrangements can have a power of 2-4 kW to provide an adequate water flow. The low energy consumption is made possible due to the fact that the inlet and outlet are located at the same depth. The reason for this is that effects of variations in salt content and temperature, and hence density, are very small at the inlet and outlet. This means that the arrangements do not need to account for density differences in the different water layers, but only need to overcome the flow resistance. A typical flow velocity is 1 to 2 fish lengths/second. The maximum velocity for "Extended Smolt" is 40 cm/sec. Currently, Extended Smolt is defined as fish from the time of smoltification (ability to survive in sea water) until it reaches approx. 1 kilo. The maximum velocity for edible salmon fish is 80 cm/sec. The farming plant according to the invention is also applicable for adult fish.

The invention may comprise lifting and lowering means in order to provide variable length for the inlet and outlet pipes. Variable length inlet and outlet pipes can be advantageous if the water depth having the ideal temperature varies over time or if the plant is to be used with different species. Adjustment of depth and hence temperature may be implemented for optimizing purposes in connection with different species or growth stages.

The farming plant may comprise at least four ballastable buoyancy tanks which can be selectively emptied or filled in order to lift, lower, or tilt the farming plant. In this manner, the plant can easily be lifted above the water line to facilitate cleaning, inspection, and maintenance. Also, in the case of differentiated emptying of the tanks, the plant may be tilted in order to concentrate the fish in one end of the plant to facilitate emptying.

The plant may include one or more water pumps for emptying the buoyancy tanks.

Normally, the accommodation assembly including the residential compartment will be provided with at least one feeding opening in the top. In general, several openings will be provided to be able to distribute the fodder across the residential compartment, to be able to inspect the plant and fish, to provide openings for discharging the fish, and for the fish to be able to obtain oxygen for the air bladder. These openings may be covered by a suitable lattice or net in order to prevent depletion due to birds, etc.

The residential compartment has a flow direction and a transverse direction, and may have an oval cross section in the transverse direction. The oval cross section allows the fish to move in a more horizontal plane and is advantageous for production/technical reasons. The oval cross section is also favorable to obtain a better visual control of the fish. Typically, the ratio between the height, width, and length of the oval residential compartment will be 1 unit height, 2 to 3 units width, 6 to 16 units length (the length of the residential compartment is 6 to 16 times the internal height of the residential compartment and the width of the residential compartment is two to three times its height.)

The accommodation assembly may further comprise mud traps for collecting fodder residues and fish waste, and optionally, a means for collecting dead fish.

The residential compartment may have a volume in the range of 2000 $m^3$ to 20,000 $m^3$, but no absolute upper bound exists except for the limitations imposed by production/technical considerations, installation and handling considerations, and the minimum oxygen content in the water.

The lengths of the inlet and outlet pipes are adapted so that water is taken from a depth (h) in the order of 30 meters. However, this depth can be adjusted according to the organisms to be excluded, the desired water temperature, the desired content of salt, etc. The inlet and outlet pipes may have a length within a range of 20 to 50 meters. Hence, the plant can be adapted for the breeding of different marine fauna and for different water environments.

Two barrier lattices may be positioned on each side of the residential compartment between the end sections and the residential compartment, so that the barrier lattices can be replaced in order to vary the lattice width according to the size of the species farmed without having to empty the residential compartment. During the growth phase of the fish, it is advantageous to replace these lattices to minimize the flow resistance. The lattices can be replaced without the risk of fish escaping. The lattices may also be lifted and lowered for cleaning purposes also when the plant is operated. For example, the lattices can be slidably mounted in suitable rails.

The invention further includes a module for an accommodation assembly of a farming plant as described above. The module includes at least two mutually spaced ribs having at least one opening for a substantially oval residential compartment section with a single-curve compartment substantially perpendicularly mounted in the ribs. At least two stiffening pipes are provided between the ribs. A feeding opening is formed in the oval compartment section between the ribs. The module is adapted for being fastened to at least one other module having a similar oval cross-section. The module can be made of polyethylene, and is specially designed for being constructed of polyethylene plates.

The modules may further include mud traps for collecting fodder residues and fish waste.

The stiffening pipes may form ballast tanks for the lifting and lowering of the farming plant.

The at least two ribs may form walls for the feeding opening.

The invention further includes an accommodation assembly for a farming plant consisting of at least two modules as described above, welded together by way of plastic welding.

The invention further includes a method for manufacturing an accommodation assembly for a modular farming plant as described above comprising plastic welding the individual modules to each other in an end-to-end relation until an elongate oval residential compartment comprised of a number of modules as determined by a desired capacity for the farming plant has been formed. In this manner, farming plants of various sizes consisting of identical modules can be constructed, providing significant production/technical advantages.

The invention further includes the use of a farming plant as described above for breeding smolt. The plant may be adapted for other marine fauna by varying the lattice size, throughput of light, length of the inlet and outlet pipes, water flow, number of feeding openings, mud traps, etc. For example, for the farming of shells and shellfish, suitable structures needed for such farming can be incorporated.

The invention further includes a method for emptying a farming plant as described above comprising tilting the farming plant through emptying at least one of the ballastable buoyancy tanks in order to concentrate the fish in one end of the residential compartment.

The present invention provides a plant ensuring an adequate oxygen content in the water and the oxygen content of the water can be easily adjusted by varying the water throughput. Exercise for improving the well-being of the fish can be optimized.

The accommodation assembly may be composed of polyethylene modules typically having a translucency of 50%. This provides a desired amount of light to ensure the well-being of salmon fish. The translucency of the plastic can be adapted for the need for access to light of the various species. For example, a cod breeding plant will include a type of polyethylene which hardly lets through any light at all. These features are important for well-being and ability of long-term survival. Another exemplary material that can be used is glass-fiber armed plastic.

DETAILED DESCRIPTION OF THE INVENTION

Figure 1:
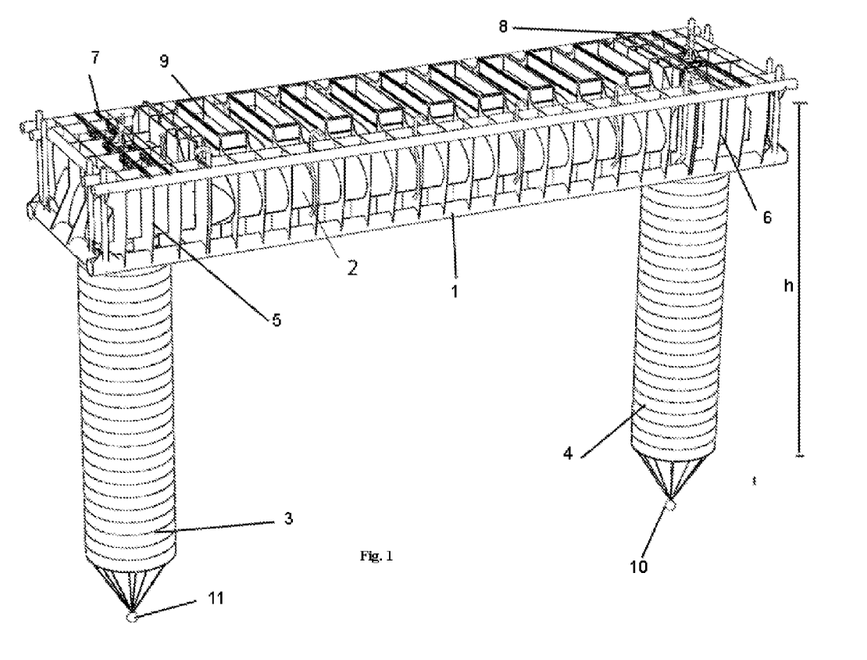
FIG. 1 is a perspective view of a farming plant according to the invention.

FIG. 1 shows a longitudinal flow farming plant 1 according to the invention. The plant 1 is adapted for floating in free water and comprises a horizontal, watertight accommodation assembly 2 including an aquaculture residential compartment with openings 9 for feeding. Accommodation assembly 2 is connected to a substantially vertical inlet pipe 3 and a substantially vertical outlet pipe 4 via two end sections 5, 6. End sections 5, 6 are essentially two right-angle pipe bends connecting the accommodation assembly 2 to the inlet and outlet pipes. The plant is symmetrical about a transverse plane at the center of accommodation assembly 2. Barrier lattices 7, 8 are provided at each end of the residential compartment. FIG. 1 shows nine feeding openings 9, and accommodation assembly 2 is composed of nine standardized residential compartment modules. This will be explained below. Stabilizing ballasts 10, 11 are provided at the end of inlet pipe 3 and outlet pipe 4 in order to stabilize the plant.

Figure 2:
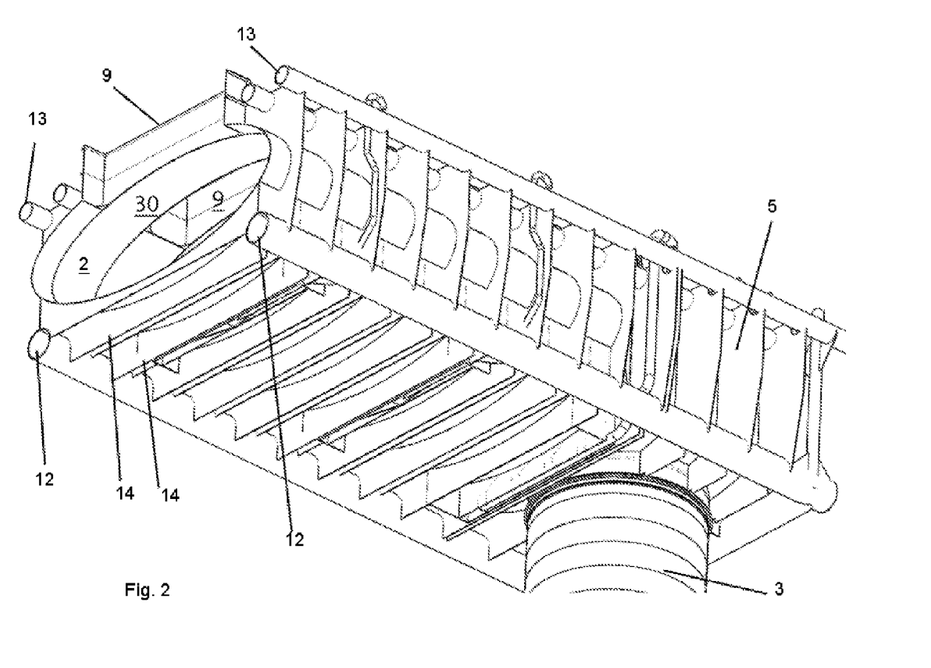
FIG. 2 shows part of the farming plant shown in FIG. 1.

FIG. 2 shows a plant arrangement similar to the one shown in FIG. 1, but in which accommodation assembly 2 has not been completed (missing several residential compartment modules) so that the oval shape of residential compartment 30 of accommodation assembly 2 can be seen. Also appearing in FIG. 2 are lower stiffening pipes 12, upper stiffening pipes 13, and module ribs 14. Residential compartment 30 is shown as being connected to inlet pipe 3 and end section 5 so that a conduit is formed through inlet pipe 3, end section 5, accommodation assembly 2, end section 6, and outlet pipe 4. Feeding opening 9 is also shown.

Figure 3:
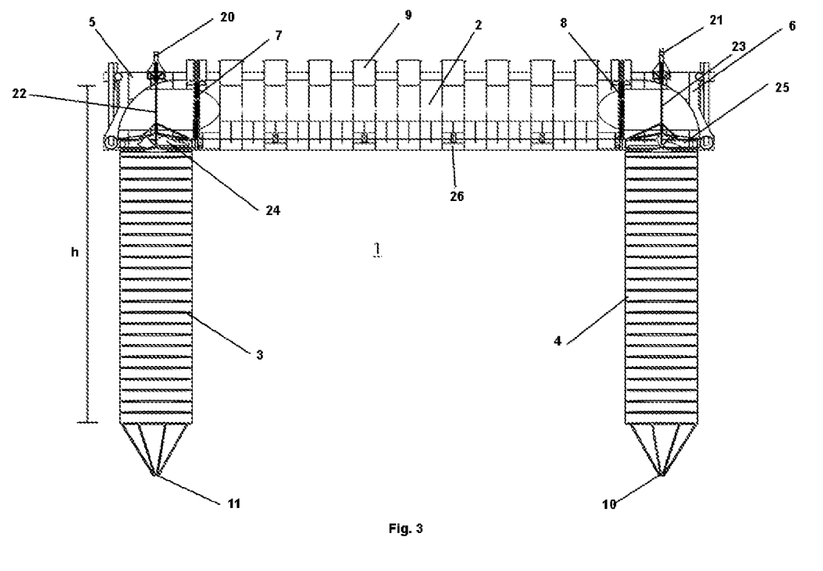
FIG. 3 is a cross-sectional side view of a farming plant similar to the farming plant of FIG. 1.

FIG. 3 is a cross-sectional side view of a farming plant 1 similar to the plant shown in FIG. 1. Appearing in FIG. 3 are inlet pipe 3, inlet end section 5, inlet barrier lattice 7, residential compartment 30, accommodation assembly 2 including nine feeding openings 9, outlet barrier lattice 8, outlet end section 6, and outlet pipe 4. A vertical shaft electric motor 20 is positioned above inlet end section 5. A vertical shaft 22 extends from the motor, through inlet end section 5, and down to a propeller 24 or a flow creating means of another type. In this manner, motor 20 can be located above water level, and no gears or watertight bushings are required for the shaft. This provides an economical and operationally reliable solution requiring only a minimum of maintenance. In a similar manner, a motor 21, having a shaft 23 and a propeller 25, is provided at the outlet side. Also shown in the drawings are the depth (h) indicating the water depth from which the plant gets water as well as stabilizing ballasts 10, 11 ensuring that the inlet and outlet pipes remain in a substantially vertical direction. From FIG. 3, it also can be clearly seen how inlet and outlet lattices 7, 8 are accessible from above so that they can be easily replaced, cleaned, and the like. Double lattices are provided, so that these operations can be carried out without removing the content of the residential compartment, etc. At the bottom of accommodation assembly 2, four mud traps 26 are provided. Inlet pipe 3 and outlet pipe 4 may be length adjustable in order to adapt the farming plant to different water temperatures, etc. The adjustability can be enabled, for example, through the use of telescopic pipes. The pipes may then be moved up or down using suitable ropes or wires (not shown). A system in which inlet and outlet pipes 3, 4 are replaced to adapt the pipes according to a desired length could also be used, but this would be a less flexible solution.

Figure 4:
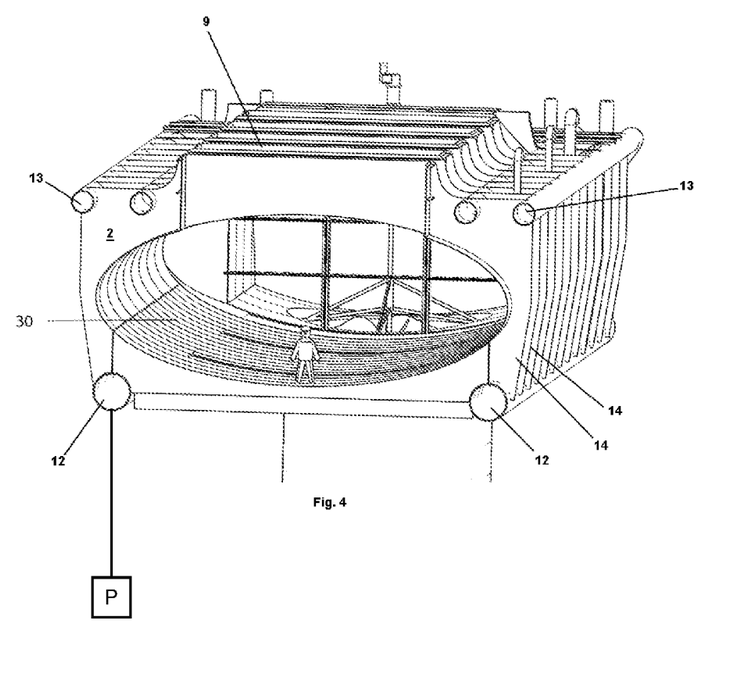
FIG. 4 shows four assembled modules for a farming plant.

FIG. 4 shows the same arrangement as FIG. 2, but seen from a different angle. Accommodation assembly 2 is not complete (missing several residential compartment modules) so that the oval shape of residential compartment 30 can be seen. FIG. 4 also shows lower stiffening pipes 12, upper stiffening pipes 13, and module ribs 14. Residential compartment 30 is shown as being fluidly connected with inlet pipe 3 and end section 5. Feeding opening 9 is also shown. In an embodiment of the invention, water can be pumped out of stiffening pipes 12 in order to lift the farming plant to bring the oval residential compartment above water level. This can be done for inspection, cleaning, and maintenance. Stiffening pipes 12 may also form separate compartments in the longitudinal direction so that the plant can be tilted to gather fish or the like in a end of the plant to facilitate the pump-out thereof. Stiffening pipes 12 may include internal cross-walls defining the compartments, and each compartment can include a dedicated filling and emptying system. Alternatively, a pump P can be used which is moved around between the separate compartments. Ribs 14 adding rigidity to the oval pipe 27 forming compartment 30, are positioned perpendicularly to the oval pipe 27.

Figure 5:
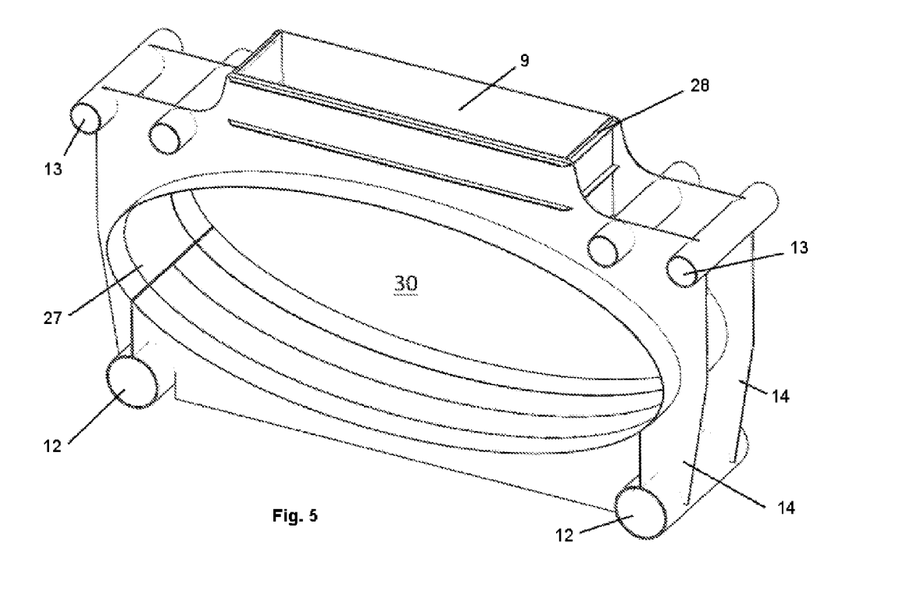
FIG. 5 shows a single module for a farming plant.

FIG. 5 shows a module for a farming plant according to the invention. Preferably the module is made of plastic, such as polyethylene, and includes two parallel ribs 14. The ribs 14 have an oval opening in which the oval pipe 27 forming residential compartment 30 is located. A feeding opening 9 is formed at the top of pipe 27, defined by ribs 14 and end walls 28. Upper stiffening pipes 13 and lower stiffening pipes 12 add rigidity to the structure. The module is configured for being assembled with other similar modules, e.g., by way of plastic welding. The components of which the module is composed may be formed from plates which are cut or punched and then welded together with the other components. The module can be constructed with no double curve surfaces.

Figure 6:
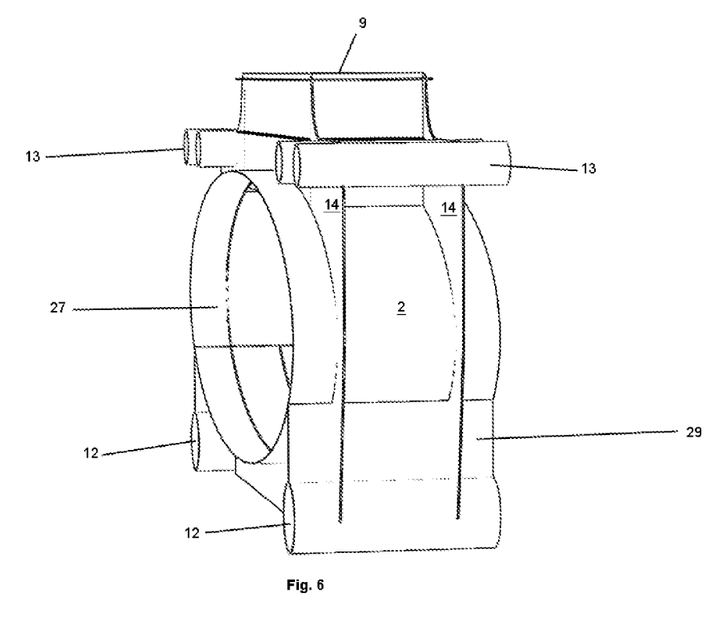
FIG. 6 shows the module of FIG. 5 from another angle.

FIG. 6 is similar to FIG. 5, and shows an additional lengthwise rib 29 in the longitudinal direction more clearly than in FIG. 5. Lengthwise rib 29 adds rigidity in the longitudinal direction and is welded between the transverse ribs 14, lower stiffening pipes 12, and oval pipe 27 forming residential compartment 30.

The invention claimed is:

1. A fish farming plant adapted for floating in free water, comprising:
   an inlet pipe for supplying water;
   an accommodation assembly, which is substantially horizontal during operation, including a residential compartment having an inlet end and an outlet end;
   a first end section between the inlet pipe and the inlet end of the residential compartment;
   at least one means for providing water flow through the residential compartment;
   at least one barrier lattice at the inlet end of the residential compartment;
   an outlet pipe for discharging water;
   a second end section between the outlet pipe and the outlet end of the residential compartment; and
   at least one barrier lattice at the outlet end of the residential compartment,
   wherein the residential compartment is a closed compartment having
      at least one feeding opening along a top side of the accommodation assembly, the residential compartment of the accommodation assembly having a flow direction and an oval cross section transverse to the flow direction, and
   wherein the at least one feeding opening is oblong and extends substantially across an entire width of the oval cross section of the residential compartment.

2. The fish farming plant of claim 1, wherein:
   during operation, the inlet pipe is a substantially vertical inlet pipe, configured to take water from a water depth having a desired water quality from a depth (h);
   the first end section is angled and positioned between the inlet pipe and the inlet end of the residential compartment;
   the outlet pipe is substantially parallel to the inlet pipe and is configured to discharge the water at the water depth (h); and
   the second end section between the outlet pipe and the outlet end of the residential compartment is angled.

3. The fish farming plant of claim 2, wherein a length of the inlet pipe and the outlet pipe is adapted so that water is taken from the depth (h) of 30 meters.

4. The fish farming plant of claim 1, further comprising:
   a first means for providing water flow in the first end section and a second means for providing water flow in the second end section.

5. The fish farming plant of claim 1, wherein the at least one means for providing water flow comprises:
   a motor which, during operation of the fish farming plant, is positioned above a water surface,
   a substantially vertical shaft connected to the motor, and
   a propeller configured to rotate in a substantially horizontal plane.

6. The fish farming plant of claim 1, further comprising at least four ballastable buoyancy tanks which can be selectively emptied or filled in order to lift, lower, or tilt the fish farming plant.

7. The fish farming plant of claim 6, further comprising at least one water pump for emptying the at least four ballastable buoyancy tanks.

8. A method for emptying a fish farming plant according to claim 7, comprising tilting the fish farming plant through emptying at least one of the four ballastable buoyancy tanks in order to concentrate a species being farmed in an end of the residential compartment.

9. The fish farming plant of claim 1, wherein the accommodation assembly further includes mud traps for collecting fodder residues and fish waste.

10. The fish farming plant of claim 1, wherein the residential compartment has a volume in a range of 6000 m$^3$ to 20,000 m$^3$.

11. The fish farming plant of claim 1, wherein:
   the at least one barrier lattice at the inlet end of the residential compartment includes two barrier lattices provided on a first side of the residential compartment between the first end section and the residential compartment, and
   the at least one barrier lattice at the outlet end of the residential compartment includes two barrier lattices provided on a second side of the residential compartment between the second end section and the residential compartment,
   so that the two barrier lattices at the inlet end of the residential compartment and the two barrier lattices at the outlet end of the residential compartment can be replaced in order to vary a lattice width according to a size of farmed species without having to empty the residential compartment.

12. A module for a residential compartment of a fish farming plant of claim 1, comprising:
   at least two mutually spaced ribs, each of the at least two mutually spaced ribs having at least one opening for the residential compartment;
   the residential compartment being arranged substantially perpendicularly in the at least two mutually spaced ribs; and
   at least two stiffening pipes disposed through each of the at least two mutually spaced ribs;
   the at least one feeding opening being formed in the residential compartment between the at least two mutually spaced ribs;
   whereby the module is configured to be fastened to at least one other module having a similar oval cross section.

13. The module of claim 12 wherein the at least two mutually spaced ribs form walls of the at least one feeding opening.

14. The module of claim 12, wherein the module is made of welded polyethylene.

15. A residential compartment for a fish farming plant composed of at least two polyethylene modules according to claim 11, welded together through plastic welding.

16. A method for manufacturing a residential compartment for a fish farming plant comprised of polyethylene modules according to claim 11, comprising plastic welding the individual modules to each other in an end-to-end relation until an elongate oval residential compartment including a number of modules as determined by a desired capacity for the fish farming plant has been formed.

17. The module of claim 12, wherein the accommodation assembly further comprises mud traps for collecting fodder residues and fish waste.

* * * * *